United States Patent [19]

Schilling

[11] Patent Number: 4,597,799
[45] Date of Patent: Jul. 1, 1986

[54] CATIONIC BITUMINOUS EMULSIONS AND EMULSION AGGREGATE SLURRIES

[75] Inventor: Peter Schilling, Charleston, S.C.

[73] Assignee: Westvaco Corporation, New York, N.Y.

[21] Appl. No.: 703,914

[22] Filed: Feb. 21, 1985

[51] Int. Cl.[4] .............. C08L 95/00; C09D 3/24; B01J 13/00
[52] U.S. Cl. .............. 106/277; 106/273 N; 106/281 N; 208/44; 252/311.5
[58] Field of Search .............. 252/311.5; 106/277, 106/273 N, 277, 281 N

[56] References Cited

U.S. PATENT DOCUMENTS

| | | | |
|---|---|---|---|
| 2,890,228 | 6/1959 | Forster | 260/406 |
| 3,035,000 | 5/1962 | Fulmer | 260/404.8 |
| 3,148,199 | 9/1964 | DeGroote et al. | 528/361 |
| 3,291,764 | 12/1966 | Findley | 260/404.5 |
| 3,324,041 | 6/1967 | Sommer et al. | 106/277 |
| 3,445,258 | 5/1969 | Ferm | 106/277 |
| 3,466,247 | 9/1969 | Ohtsuka et al. | 252/311.5 |
| 3,764,359 | 10/1973 | Dybalski | 106/280 |
| 3,873,481 | 3/1975 | Laudise | 523/401 |
| 3,900,437 | 8/1975 | Preston | 528/403 |
| 4,008,096 | 2/1977 | Knapp | 106/277 |
| 4,447,269 | 5/1984 | Schreuders et al. | 106/277 |
| 4,450,011 | 5/1984 | Schilling et al. | 106/269 |
| 4,462,840 | 7/1984 | Schilling et al. | 106/277 |
| 4,464,286 | 8/1984 | Schilling | 252/311.5 |

*Primary Examiner*—A. Lionel Clingman
*Attorney, Agent, or Firm*—Terry B. McDaniel; Richard L. Schmalz

[57] ABSTRACT

Reaction products of polyamines with epoxidized vegetable oils or epoxidized fatty esters are disclosed which give emulsions capable of producing cationic medium set mixing grade asphalt emulsions, as well as rapid set asphalt emulsions. Solventless asphalts as well as asphalts containing up to 12% by volume of a hydrocarbon oil can be used for emulsification. Emulsions prepared with these condensation products behave similarly to emulsions prepared with condensation products of polyamines and tall oil derived $C_{21}$-dicarboxylic acid, $C_{22}$-tricarboxylic acid or sulfonated tall oil fatty acids.

19 Claims, No Drawings

CATIONIC BITUMINOUS EMULSIONS AND EMULSION AGGREGATE SLURRIES

FIELD OF THE INVENTION

This invention relates to improved bituminous emulsions, specifically to cationic medium set mixing grade emulsions and quick setting emulsion-aggregate paving slurry seal mixtures. More particularly, it relates to new emulsifiers for solventless and solvent containing mixing grade, oil-in-water cationic bituminous emulsions, which emulsifiers are the reaction products of monoamines and/or polyamines with certain epoxidized vegetable oils or fatty acid esters.

DESCRIPTION OF THE PRIOR ART

In paving operations, four main practices are employed to achieve thorough mixing of bitumen and aggregate:

(1) mixing of free flowing heated asphalt (asphalt cement) with pre-dried aggregate;

(2) mixing pre-dried aggregate with asphalt diluted with a hydrocarbon solvent (cutback asphalt, cutter stock) at ambient temperatures;

(3) mixing aggregate with asphalt emulsions, e.g., oil-in-water emulsions, obtained by vigorous agitation of asphalt and water in the presence of an emulsifying agent; and (4) mixing fine graded aggregate with water and asphalt emulsions with or without the addition of fillers such as cement or hydrated lime in a mobile paving unit, and immediate laydown on the road surface to be rejuvenated. This process is known as slurry sealing.

Because of increasing cost in energy and hydrocarbon solvents and because of environmental concerns, the use of emulsified asphalt is increasing. Dependent on the emulsifier used to achieve an emulsion, anionic or cationic emulsions are obtained. In anionic emulsions, asphalt droplets are negatively charged; in cationic emulsions, the asphalt droplets bear positive charges and migrate to the cathode when an electric field is applied. Experience in the field has shown that cationic emulsions are easier to apply and obviate many of the disadvantages of anionic emulsions, such as unpredictable break and poor bonding of asphalt to the aggregate surface resulting in stripping. Due to the electrostatic attraction of positively charged asphalt droplets and negatively charged aggregate surfaces, cationic bituminous emulsions deposit more rapidly, and stronger bonds between bitumen and aggregate are obtained.

Generally, depending on the characteristics of the type of mixing and rate of break, cationic aqueous bituminous emulsions are classified as rapid setting (CRS), medium setting (CMS) and slow setting (CSS). The rate of set is determined by the type and the amount of emulsifier and the pH value of the cationic soap solution. In the case of rapid setting emulsions, mainly used for repair work of old wearing courses, the emulsion is applied on the existing surface and aggregate is spread on top, and after compaction, the road can be opened to traffic shortly after the application of the new coat (chip seal, etc.). Medium setting emulsions are mixed with aggregate prior to being used in road construction, and slow set emulsions can be mixed with aggregate and stored for a longer period of time without breaking on the aggregate surface.

Conventionally, emulsion slurry seals are formulated from (1) mineral aggregate which is a fine stone aggregate and/or mineral filler and (2) about 15% to about 25% by weight thereof of a mixing-grade, slow-setting emulsion containing from about 50% to about 75% by weight of bituminous residue (usually asphalt), with a further addition of about 5% to about 25% of water, based on the weight of the dry aggregate, to attain slurry consistency. Usually, densely-graded aggregates, such as granite screenings, limestone screenings, dolomite screenings and blast furnace slag, are combined with bituminous emulsions to produce slurry seal compositions. These aggregates range in size from anything passing all through a sieve of No. 4, and even No. 10 mesh, with from 15% to 20% passing through as fine a mesh as 200 mesh, as described in ASTM C136.

The advent of slurry seal as a paving and road maintenance technique was first developed for use with anionic aqueous bituminous emulsions. A slurry seal is an intimate mixture of emulsified bituminous material and fine-graded aggregate held in suitable suspension until applied to the road surface. The slurry seal emulsion must be of an oil-in-water type. In such admixture with aggregate, the aqueous emulsion form of the bituminous material has been generally preferred because it is less hazardous and more economical to use than hot mix or cutback (solvent containing) asphalts. Further, the aqueous emulsion form can be stored, transported and applied at much lower temperatures, obviating the necessity of heating equipment to maintain a bitumen-aggregate system in a workable or usable form. While these advances have been recognized, widespread acceptance has not been achieved due to disadvantages found in previous aqueous bituminous emulsions.

More recently, cationic bituminous emulsions have come into use and eliminate many of the disadvantages of the anionic emulsions.

Cationic emulsions are obtained by employing a variety of nitrogen containing organic compounds, such as fatty amines, fatty diamines, fatty triamines, fatty amidoamines, fatty imidazolines, reaction products of all these compounds with ethylene oxide, and fatty mono- and diquaternary ammonium salts. The fatty radical of these compounds can have a variety of chemical structures, and the building blocks for the preparation of these amines can be obtained from a variety of sources, such as petroleum refinates, animal fats, vegetable and fish oils, and tall oil. Amidoamines suitable as emulsifiers are disclosed in U.S. Pat. No. 3,230,104 to Falkenberg and in U.S. Pat. No. 3,097,174 to Mertens. Combinations of fatty monoamines and triamines are disclosed in U.S. Pat. No. 3,738,852 to Doi: fatty diamines are disclosed in U.S. Pat. No. 3,728,278 to Tramelli and U.S. Pat. No. 3,581,101 to Gzemski; fatty quaternary and diquaternary salts and modifications thereof are disclosed in U.S. Pat. No. 3,220,953 to Borgfelt, U.S. Pat. No. 3,867,162 to Elste, U.S. Pat. No. 3,764,359 to Dybalski, U.S. Pat. No. 3,956,524 to Doughty and U.S. Pat. No. 3,466,247 to Ohtsuka, and fatty imidazolines are taught in U.S. Pat. No. 3,445,258 to Ferm.

Generally, cationic emulsions prepared with fatty amines, fatty diamines, fatty amidoamines, etc., are unstable when mixed with a variety of siliceous or calcareous aggregates. Rapid breaking on the aggregate surface is observed with an increase in stiffening. At this point, the mix becomes unworkable. To overcome this problem, it is common practice to use cutback asphalt instead of asphalt cement for medium set mixing grade asphalt emulsions. Although cutback emulsions prepared with these emulsifiers also break when mixed with the aggregate, the solvent (a hydrocarbon oil, such as naphtha, kerosene, diesel oil, etc.) decreases the viscosity of the asphalt and increase the workability of the aggregate-asphalt mix. After placement of the mixes, the solvent evaporates and the final stiff aggregate-asphalt matrix is obtained. Because of the dramatically increased cost of solvents in recent years and because of the effort to reduce pollution, suitable emulsifiers are sought for cationic mixing grade emulsions without using solvent.

The aqueous cationic bituminous emulsions themselves are relatively stable, and the emulsion stability may be enhanced by various additives well known in the art. Most cationic bituminous emulsions, however, deposit on the surface of aggregate materials rapidly when aggregate is contacted with the emulsions. Bitumen from an aqueous cationic bituminous emulsion is deposited from the emulsion due to the charge attraction between the bituminous droplets and the aggregate materials. The rapid setting action of cationic bituminous emulsions is of considerable advantage in road building, such as seal coats, since the roads can be opened to traffic shortly after application of the coating. Although the rate of asphalt deposition, for example, from the emulsion can be controlled to some extent, the time required for complete deposition is never very long and it is therefore the practice to combine the cationic emulsion with the aggregate at the site of road construction, either on the surface of the road itself, or in a mobile mixer which permits the emulsion aggregate mix to be rapidly spread. Due to the charge attraction mechanism, the rapidity of deposition of bituminous materials from the cationic emulsion is closely related to the generally negatively charged surface area of the aggregate or filler material. Thus, while a specific cationic bituminous emulsion might provide suitable properties for use in conjunction with some aggregates, the same cationic emulsion may not exhibit suitable properties when used with very finely ground materials having vastly larger total surface area. The rapid deposition characteristics of the cationic bituminous emulsions frequently makes it impossible to use such emulsions with fine-graded aggregate in slurry form such as in gun application or spreader box application. Therefore, since the slurry seal should mix well, pump well, lay down well, not stiffen while being applied, and, after setting, wear well under traffic, it is particularly desirable to be able to control the setting time of the slurry for various aggregates employed. The use of tallow quaternary ammonium salts and tallow diquaternary diammonium salts for making emulsions suitable for slurry seal, a solventless application, is described in U.S. Pat. No. 3,764,359 to Dybalski, and the use of a quaternary amine obtained by reacting epichlorohydrin, trimethylamine and nonylphenol for solventless mixes is disclosed in U.S. Pat. No. 3,956,524 to Doughty.

Recently the reaction products with polyamines with certain tall oil derived $C_{21}$-dicarboxylic acid, $C_{22}$-tricarboxylic acid and sulfonated tall oil fatty acids were disclosed in U.S. Pat. Nos. 4,447,269, 4,450,011 and 4,462,840 as emulsifiers for cationic quick setting emulsions for slurry seal applications or cationic medium setting mixing grade asphalt emulsions.

The general object of this invention is to provide additional versatile emulsifiers for solventless and solvent containing mixing grade, oil-in-water bituminous emulsions. Another object of this invention is to provide emulsifier formulations for mixing grade emulsions and cationic quick set emulsions for slurry sealing. A further object of this invention is to provide a series of new fatty hydroxy-amino-amidoamines and imidazolines prepared as the reaction product of epoxidized vegetable oils or fatty acid esters and polyamines, suitable as emulsifiers for cationic oil-in-water emulsions.

SUMMARY OF THE INVENTION

It has been found that in contrast to amidoamines and imidazolines which are obtained by condensation of fatty acids, having a chain-length of $C_{12}-C_{22}$, with polyethylene amines, such as diethylene triamine, which give cationic rapid set emulsions, reaction products of polyamines with epoxidized vegetable oils or epoxidized fatty esters give emulsions capable of producing cationic medium set mixing grade asphalt emulsions, as well as rapid set asphalt emulsions. Solventless asphalts as well as asphalts containing up to 12% by volume of a hydrocarbon oil can be used for emulsification. Emulsions prepared with these condensation products behave similarly to emulsions prepared with condensation products of polyamines and tall oil derived $C_{21}$-dicarboxylic acid, $C_{22}$-tricarboxylic acid or sulfonated tall oil fatty acids.

DESCRIPTION OF THE PREFERRED EMBODIMENTS

The epoxidized vegetable oils or epoxidized fatty ester used in the preparation of the invention cationic emulsifiers are obtained from natural oils (glycerides) such as soybean oil, linseed oil, esters such as alkyl oleates or alkyl tallates or animal fats by epoxidation with peracetic acid or perbenzoic acid. These oxiranes are most widely used as plasticizers and stabilizers for polyvinyl chloride or as coreactants for epoxy resins. Epoxy acids or esters can also be derived from fatty chlorohydroxy acids or esters. As an example, the epoxidized triglyceride of oleic acid (I) may be used to describe the emulsifiers of the invention:

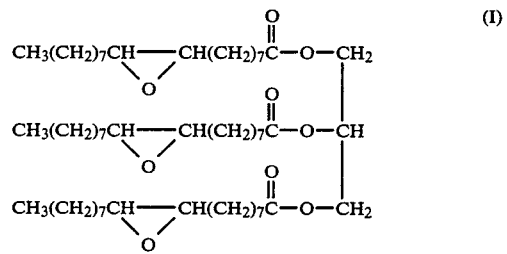
(I)

By reacting 1 mole of this ester with at least 6 moles of a polyamine such as diethylene triamine to 130°–180° C., glycerol will be set free and as reaction products three moles of a mixture of isomeric hydroxy-amino ethylamino amido amine (II, II') will be formed.

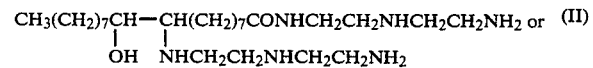

-continued

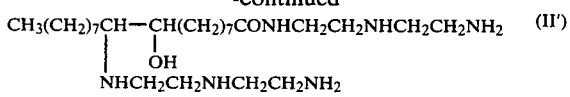
(II')

Upon further heating to 180°-260° C., ring closure will occur and a hydroxy-amino ethylamino imidazoline (III) will be formed.

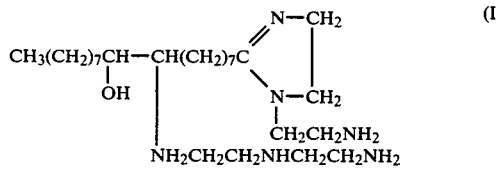
(III)

Reaction products with ammonia, primary and secondary amines having aliphatic, aromatic cycloaliphatic substituents with chain lengths of $C_1$-$C_{20}$ will give hydroxy amino amides as described in IV.

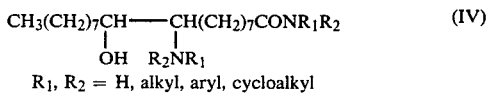
(IV)

$R_1, R_2$ = H, alkyl, aryl, cycloalkyl

The alkyl groups can also contain hydroxy or ether functions such as in ethanol amine, diethanol amine or morpholine.

Fatty chloro-hydroxy esters, where the chlorine and the hydroxyl group are bound to adjacent carbon atoms upon reaction with polyamine, give the same products.

These products are, however, never obtained in high purity, since when a blend of 6 moles diethylene triamine and one mole fatty epoxidized ester is heated slowly, some of the diethylene triamine distills with the water. Thus, upon prolonged heating, in addition to the products II and III, polymers of the polyamine-polyamide type are formed as byproducts. These byproducts can contain polyamine structures, polyamidoamine structures and polyimidazoline structures. The formation of oligomers or polymers will increase with increasing ratio of epoxy ester to polyamine.

The formation of hydroxy-amino imidazolines is limited to polyethylene amines and polyamines characterized by at least one ethylene diamine functional group with at least three hydrogens attached to the two nitrogens. Compounds of this group which are able to give both amidoamines and imidazolines are: ethylene diamine, diethylene triamine, triethylene tetramine, tetraethylene pentamine, pentaethylene hexamine, and higher homologues; N-aminoethyl propane diamine, N,N'-diaminoethyl propane diamine and the N-aminoethyl- or N,N'-diaminoethyl-substituted butane diamines, pentane diamines and hexane diamines, and N-hydroxy ethyl ethylene diamine. These compounds have the general formulae

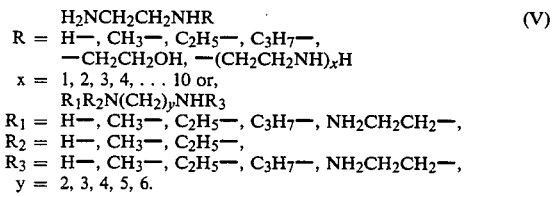
(V)

R = H—, $CH_3$—, $C_2H_5$—, $C_3H_7$—, —$CH_2CH_2OH$, —$(CH_2CH_2NH)_xH$
x = 1, 2, 3, 4, . . . 10 or,
$R_1R_2N(CH_2)_yNHR_3$
$R_1$ = H—, $CH_3$—, $C_2H_5$—, $C_3H_7$—, $NH_2CH_2CH_2$—,
$R_2$ = H—, $CH_3$—, $C_2H_5$—,
$R_3$ = H—, $CH_3$—, $C_2H_5$—, $C_3H_7$—, $NH_2CH_2CH_2$—,
y = 2, 3, 4, 5, 6.

Amines capable of forming amidoamines but not imidazolines are: 1,3-diaminopropane, 1,4-diaminobutane 1,5-diaminopentane, 1,6-diaminohexane, piperazine (1,4-diazacyclohexane), N-aminoethylpiperazine, N-hydroxyethyl piperazine, N-aminopropyl-propane diamine-1,3, N-methyl-N-aminopropylpropane diamine-1,3, N,N-dimethylpropane diamine-1,3, N,N-diethyl propane diamine-1,3, N,N-dimethyl-ethylene diamine, N,N-diethyl ethylenediamine; N-aminohexylhexane diamine-1,6.

In addition, polyamines containing other functionalities such as ether (—O—), thioether (—S—), sulfoxide (—SO—) sulfone (—$SO_2$—) groups, as well as aromatic structures are also suitable for condensation.

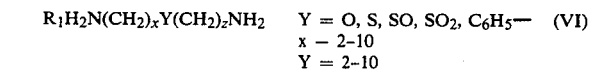
Y = O, S, SO, $SO_2$, $C_6H_5$— (VI)
x = 2-10
Y = 2-10

Certain hydroxy-amino amidoamines or hydroxy-amino imidazolines with tertiary nitrogens, such as the reaction product of fatty epoxy esters and N,N-dimethylpropane diamine-1,3 of the formula

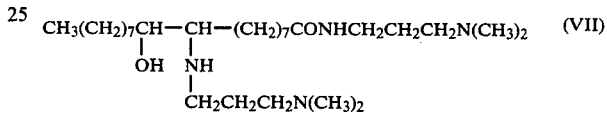
(VII)

may be modified by further reaction with an alkylating agent such as methyl-, ethyl-, or benzyl halides, sulfates, phosphates, etc. The resulting compounds are classified as mono-, di-, or triquaternary ammonium salts. Their main characteristic is their solubility in aqueous systems without addition of acid, as is the case with amines, amidoamines, or imidazolines. An example of this type of quaternary ammonium salt as prepared by reacting one mole of the formula (VII) compound with four moles of methyl chloride to provide the following structure:

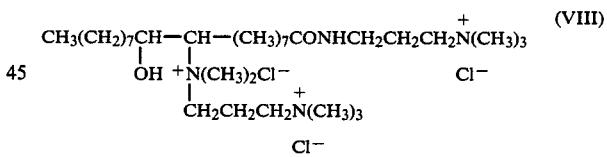
(VIII)

Further modifications of the above described mono-, di-, or polymeric hydroxy-amino amidoamines or hydroxy amine imidazolines are the reaction products with reactive oxirane systems such as ethylene oxide, propylene oxide or butylene oxide. Reaction occurs initially on primary and secondary nitrogens, that is, a nitrogen to which one or two hydrogen atoms are covalently bound. The reaction products belong to the class of N-hydroxyethyl, N-2-hydroxypropyl- and N-2-hydroxy butyl hydroxy-amino amidoamines or hydroxy-amino imidazolines. If excess oxirane is reacted, polyethylene oxides, polypropylene oxides or poybutylene oxides are obtained. The hydroxyl groups will also react in this case.

The use of reaction products of polyamines with epoxidized oils or unsaturated-fatty esters as asphalt emulsifiers, and specifically as emulsifiers for solventless asphalt emulsions and emulsions for slurry seal applications, was heretofore unknown.

Reaction products of diethylene triamine, dipropylene triamine or other polyamines with epoxidized linseed oil or soybean oil are disclosed as polyamide prepolymers useful as adhesives or resin hardeners are disclosed in the following patents: French No. 1,164,471 (Oct. 9, 1958), U.S. Pat. No. 2,890,228 (W. Föster, June 9, 1959), French No. 1,295,619 (June 8, 1962), British No. 953,422 (T. W. Findley, Mar. 25, 1964), U.S. Pat. No. 3,291,764 (T. W. Findley, Dec. 13, 1966), German (East) No. 50,750 (H. Schade et al., Oct. 5, 1966), British No. 816,986 (July 22, 1959), British No. 811,797 (A. R. H. Tawn, Apr. 15, 1959), U.S. Pat. No. 3,035,000 (R. W. Fulmer, May 15, 1962), U.S. Pat. No. 3,112,294 (H. A. Newey, Nov. 26, 1963), German (East) No. 56,934 (K. Buser et al., July 5, 1967), Japanese Kokai No. 75 53,499 (J. Kamiuchi et al., May 12, 1975), German Offen. No. 2,420,254 (M. A. Landise, Nov. 28, 1974).

Similar condensates are disclosed as de-emulsifiers for water in oil type petroleum emulsions in U.S. Pat. No. 3,148,199 (M. DeGroote et al., Sept. 8, 1964) and growth inhibitors for sulfate reducing bacteria in U.S. Pat. No. 3,049,492 (M. DeGroote et al., Aug. 14, 1964).

The examples which follow are illustrative of the emulsifiers used to obtain cationic asphalt in water emulsions discovered to be useful for mixing under shear with a variety of siliceous and calcareous aggregates. After setting (evaporation of water), the asphalt films show excellent adhesion to the aggregate surface.

Particularly useful are the reaction products of epoxidized linseed oil, epoxidized soybean oil, or epoxidized tall oil fatty acid esters with ethylene diamine, diethylene triamine, triethylene tetramine, and higher homologues, or aminoethyl piperazine, hydroxyethyl piperazine, N-aminoethyl ethanol amine, dipropylene triamine and any blends of these amines.

In preparing the bituminous emulsions of this invention, an aqueous acidic solution of the emulsifiers described below is intimately mixed under high shear in a colloid mill. The bitumen content can range from 30% to about 80% by weight, preferably between 60% and 70%. The dosage of the emulsifier can range from 0.1–10% by weight of the emulsion, preferably between 0.3–1.5% by weight of the emulsion. Dependent on the emulsifier, a mixing grade emulsion is obtained in a pH range of 2–7, with the optimum performance at a pH of about 3.

The "bitumen" used in the emulsion may be derived from domestic or foreign crude oil; it also includes bitumen, natural asphalt, petroleum oil, oil residue of paving grade, plastic residue from coal tar distillation, petroleum pitch, and asphalt cements diluted with solvents (cutback asphalts). Practically any viscosity or penetration graded asphalt cement for use in pavement construction as described in ASTM designation D-3381 and D-946 may be emulsified with the aid of the emulsifiers of this invention.

The cationic soap solutions are normally obtained by suspending the amidoamine or imidazoline in water to which a sufficient amount of a suitable acid, for instance, hydrochloric, sulfuric, and phosphoric acid or the like is added until the desired pH value below 7 is reached and a clear emulsifier solution is obtained. Thereafter, the soap solution which is preheated to about 55° C. and the fluid asphalt which is preheated to 120°–125° C. are mixed under high shear in a colloid mill for 30 seconds to give asphalt emulsions of brown color and creamy texture. Prior to testing according to ASTM D-244, the emulsions are stored at 70° C. for 16 hours. Aggregate mixing tests are performed by placing a weighed amount of aggregate in a mixing bowl, adding 5–10% by weight of the emulsion on top of the aggregate and mixing for one minute to five minutes. The mix is divided into three equal parts and placed in three dishes. The first sample is set aside; the second sample is washed with water immediately after mixing; and the third sample is washed with water after it was set aside for one hour. The percent coating of the aggregate surface is estimated visually. From the first sample, the percent initial coating, from the second sample, the percent initial washoff coating, and from the third sample, the percent one-hour washoff coating are obtained. The construction industry coating requirements are 95% minimum, 50% maximum and 50% minimum, respectively.

The aggregates of the invention paving slurry seal mixtures are densely graded aggregates which range in size from anything passing through a No. 4 sieve and at least 80% retained on 200 mesh.

Aggregate mixing tests are performed by mixing the aggregate with water and aqueous bituminous emulsion. An inorganic additive-mineral filler, such as portland cement; hydrated lime, limestone dust and fly ash, may be added to accelerate set/break time and organic salts, such as ammonium sulfate, or emulsifiers may be added to retard the set/break of the slurry system. Such additives shall comply with the requirements of ASTM D242. These materials are mixed in a mixing bowl until a homogeneous slurry mixture is obtained. The inability to form a stable slurry within 3 to 4 minutes of mixing time when proper proportions of each ingredient are used would indicate a mixture in which the materials are not compatible. This mix design is necessary to simulate field conditions. After the slurry is mixed, it is spread in a mold which is placed on an asphalt felt, and the set/break time is measured by blotting the exposed slurry surface with a paper towel. If no brown stain is transferred to the paper towel, the slurry is considered to be "set." The cure time could also be measured with a cohesion testing device. Many other tests such as described in ASTM D3910 are used to measure strength and other physical properties of the slurry. The *Performance Guide for Slurry Seal* published by the Asphalt Emulsion Manufacturers Association is used to measure the performance of the slurry seal.

The emulsion should be stable during mixing and should set within the designed time period following application. The emulsifiers of this invention perform very satisfactorily without auxiliary emulsifiers. For instance, the setting times can be controlled with the concentration of emulsifier, the addition of lime, cement or other inorganic additive or an organic additive, which would alter the break characteristics of the slurry system. An organic additive-polymer latex may also be employed to strengthen the matrix. The organic additive is preferably added to the emulsion-aggregate slurry.

The emulsifiers of this invention perform very satisfactorily without auxiliary emulsifiers. However, occasionally it may be necessary to alter the performance of the emulsion to obtain improved viscosity at a given asphalt content or improved stability to dust and fines on the aggregate and to lengthen or shorten setting time, etc. In these cases, one of two methods can be employed. Either a mixture of tall oil fatty acids, preferably tall oil pitch, can be added to the bitumen (asphalt) prior to emulsification to improve break or improve the viscosity of the emulsion, or blends of the above described amidoamines and imidazolines with compatible cationic or nonionic emulsifiers may be used for the emulsification of the bitumen. Auxiliary emulsifiers, which may constitute up to 90% of the total combined emulsifier formulation, are fatty amines, fatty propane diamines, fatty amidoamines, and fatty imidazolines. This class of compounds generally decreases setting time. Others are fatty monoquaternary ammonium salts and fatty diquaternary diammonium salts and nonionic emulsifiers, such as ethylene glycol polyethers of nonyl- or dodecyl phenol. Combinations with amidoamines and imidazolines, based on fatty monocarboxylic acids of various sources or $C_{19}$- and $C_{21}$-dicarboxylic acids, $C_{22}$-tricarboxylic acid or sulfonated tall oil fatty acid disclosed in U.S. Pat. Nos. 4,447,269, 4,450,011 and 4,462,840 can also be used. These blends can be also obtained by pre-blending epoxidized oils with these acids and reacting the blends with polyamine. Monocarboxylic acids suitable for this purpose are tall oil fatty acids, crude tall oil, rosin acids, rosin reacted with fumaric or maleic acid, tall oil pitch, tallow fatty acids, soya fatty acids and the like. Kraft lignin or Vinsol may also be co-reacted.

Dimer acids, which are long chain $C_{36}$-aliphatic carboxylic acids obtained by dimerization of fatty acids of various sources, may be also co-reacted. An example of this type of acid is produced by Emery Industries, Inc. under the trade name "Empol ® Dimer Acids".

The emulsions prepared with the epoxidized oil-polyamine condensates disclosed in this invention are stable and can be stored for a long period of time until required for use.

Depending on the type of aggregate and its cleanliness, mixing is improved when aggregate is prewetted with 1-5% water by weight of the aggregate if applied as solventless mixing grade emulsions. The performance of the cationic asphalt emulsions in regard to mixing characteristics and setting (higher percentage of one-hour washoff coat) can, if necessary, also be improved when based on the weight of asphalt, 1-15% of a solvent such as diesel oil is added to the asphalt prior to emulsification. The emulsions prepared with the di- and tricarboxylic acid-polyamine condensates disclosed in this invention are stable and can be stored for a long period of time until required for use. Depending on the intended application, the emulsion may be mixed with the aggregate at a central mixing plant in a large pug mill and the mix transported to the job site. Alternatively, the emulsion may be taken to the job site and mixed there, either with a mixing device, such as motorized mixing equipment, or manually.

In case emulsions prepared with these emulsifiers are used in slurry seal applications, the aggregate is prewetted with 1-15% water, dependent on weather conditions. Optionally, additives such as aluminum sulfate can be added to water or cement, or hydrated lime can be mixed with the aggregate to obtain aggregate-emulsion slurry mixes with the desired mixing performance and setting times.

The practice of this invention may be seen in the following examples wherein the preparation of various types of the emulsifiers of the invention is described and wherein the advantages of using these compounds in a medium setting mixing grade cationic bituminous emulsion are illustrated.

EXAMPLE 1

This example illustrates the variety of emulsifiers which can be obtained from the same starting materials at various temperatures and ratios of the reactants.

Emulsifier A

One Hundred (100) parts Epoxol ® 9-5 (epoxidized linseed oil, Swift Technical Products) were blended with 50 parts diethylene triamine and heated slowly to 260° C. After all the condensate was collected, it was cooled and diluted with isopropanol to 50% activity.

Emulsifier B

One Hundred (100) parts Epoxol ® 9-5 were blended with 50 parts aminoethyl ethanolamine and heated to 225° C. After all the condensate was collected, the reaction was stopped and cooled.

Emulsifier C

Three Hundred (300) parts of Flexol ® EPO (epoxidized soybean oil, Union Carbide Corporation) and 250 parts ethylene diamine were mixed at room temperature and heated slowly to 220° C. After all the reaction water and excess ethylene diamine was collected, it was cooled to room temperature and diluted with enough isopropanol to obtain a fluid product.

Emulsifier D

Two Hundred (200) parts of Flexol ® EPO and 100 parts of diethylene triamine were mixed at room temperature and heated to 265° C. After all the distillate was collected, it was cooled and enough isopropanol added to obtain a fluid product.

Emulsifier E

Two Hundred (200) parts of Flexol ® EP-8 (epoxy dioctyl tallate, Union Carbide Corp.) and 100 parts diethylene triamine were blended at room temperature and heated slowly to 225° C. for 30 minutes. After all the distillate was collected, it was cooled.

Emulsifier F

Two Hundred (200) parts of Epoxol ® 9-5 and 100 parts dimethylamino propylamine were mixed and heated to 210° C. until all the distillate was collected.

Emulsifier G

Two Hundred (200) parts of Epoxol ® 9-5 were heated with 100 parts of diethanolamine to 225° C. After cooling to 100 parts of the condensate, 50 parts of diethylene triamine was added and heated to 210° C. until all the distillate was collected.

Emulsifier H

Forty (40) parts Epoxol ® 9-5 were blended with 40 parts Rosin S and 50 parts diethylene triamine. The mixture was slowly heated to 270° C. until all the distillate was collected. It was allowed to cool and was diluted with isopropanol to obtain a fluid reaction product.

Emulsifier I

One Hundred (100) parts Epoxol ® 9-5 were blended with 100 parts tall oil fatty acid (L-5) and 200 parts of an amine blend consisting of aminoethylpiperazine, triethylene tetramine and aminoethyl ethanolamine. It was heated to 225° C. until all the distillate was collected.

Emulsifier J

Two Hundred (200) parts Flexol ® EPO were blended with 100 parts aminoethylpiperazine and heated to 260° C. After all the distillate was collected, it was cooled and diluted with isopropanol.

EXAMPLE 2

A cationic aqueous bituminous emulsion was prepared employing each of the Emulsifiers A through E of Example 1 and mixing tests with densely graded aggregates were performed with each emulsion as previously described.

First, cationic aqueous bituminous emulsions were prepared with various asphalts at 64% asphalt residue, 1.5% emulsifier at pH 2.5 and water to make 100% (percentages based on the weight of the emulsion).

Next, slurries were prepared by adding to 100 grams of Camak aggregate (granite screenings) 16% of the cationic aqueous bituminous emulsion, 10–14% water and either 0% or 1% portland cement as set accelerator or 0.05% aluminum sulfate as set retarder (percentages based on the weight of the aggregate).

For all emulsifiers tested, without additive or with the set retarder, stable homogeneous slurry mixtures were achieved within one minute of mixing time, if not noted otherwise. With 1% cement added to the mixing, the slurry mixtures were only stable for 30–50 seconds.

EXAMPLE 3

This example illustrates the quick set times of the slurries prepared in Example 2, as well as the ability to control the set times with addition of a mineral filler (portland cement). The slurry set times were determined by the test procedures previously described, i.e., by blotting with a paper towel the exposed surface of the slurry spread in a mold on an asphalt felt. If no brown stain is transferred to the paper, the slurry is considered set. The set times are shown in the following Table I.

TABLE I

| | | SLURRY SET TIMES (min.) | | | |
|---|---|---|---|---|---|
| Emulsifier | Asphalt | No Additive | Cement 0.5% | Cement 1.0% | Aluminum Sulfate 0.05% |
| A | Exxon (120–150 pen.) | 60+ | 10 | broke* | — |
| B | Exxon AC-20 | 60+ | 3 | — | 60+ |
| C | Arco AC-20 | 60+ | 2 | broke* | — |
| D | Conoco AC-20 | 60+ | 6 | broke* | 60+ |
| E | Chevron AC-20 | broke* | broke* | — | 60+ |

*Slurry broke before the one minute mix time.

EXAMPLE 4

This example illustrates the solventless mixing grade character of emulsions obtained when the above described emulsifiers were used for emulsification. To show the versatility of these emulsions, various siliceous and calcareous aggregates were used for the mixing experiments. Emulsions were prepared with various asphalts at 64%–69% asphalt residue. Excellent emulsions were obtained when 0.8–1.5% emulsifier dosage was used. Emulsions were prepared in the pH range from 2.5–4.0. The pH adjustments were made with dilute hydrochloric acid. The test data are given in Table II. The aggregate test indicates whether an emulsion is suitable for mixing operations. It was carried out with mixing bowl and spoon. Depending on the cleanliness of the aggregate, it was prewetted with 1–3% water prior to addition of the emulsion. After 5–9 grams of a emulsion (per 100 grams of aggregate) was mixed with aggregate for one-minute, initial coating, initial washoff coating, and one-hour washoff coating were determined visually. From these data, the mixing efficiency and set time with a specific aggregate can be determined.

TABLE II

| | | | | | % Wash Off Coat After | | | |
|---|---|---|---|---|---|---|---|---|
| Emulsifier | Asphalt | % Dosage | pH Value | % Initial Coating | 1 Min. | 30 Min. | 60 Min. | Aggregate |
| A | Exxon 120–150 pen. | 1.0 | 2.5 | 100 | 5 | 50 | — | Schloss |
| A | Exxon 120–150 pen. | 1.5 | 2.5 | 100 | 0 | 10 | 95 | Tennessee Limestone |
| | | | | 100 | 5 | 30 | 50 | Tennessee River Gravel |
| C | Exxon 120–150 pen. | 1.0 | 4.0 | 100 | 30 | 100 | 100 | Schloss |
| D | Exxon 120–150 pen. | 1.0 | 2.5 | 100 | 5 | 100 | 100 | Schloss |
| E | Chevron AC-20 | 1.5 | 2.5 | 100 | 0 | 30 | 90 | Schloss |
| F | Arco AC-20 | 1.5 | 2.5 | 100 | 0 | 30 | 80 | Schloss |
| G | Exxon AC-20 | 1.5 | 2.5 | 100 | 0 | 90 | 100 | Tennessee Limestone |
| | | | | 100 | 5 | 100 | 100 | Tennessee River Gravel |
| H | Exxon 120–150 pen. | 1.5 | 2.5 | 100 | 0 | 20 | 30 | Tennessee Limestone |
| | | | | 100 | 0 | 80 | 100 | Tennessee River Gravel |
| H | Exxon 120–150 pen. | 1.0 | 2.5 | 100 | 5 | 75 | — | Schloss |
| I | Chevron AC-20 | 1.5 | 2.5 | 100 | 0 | 20 | 50 | Schloss |
| J | Conoco AC-20 | 1.5 | 2.5 | 100 | 0 | 10 | 95 | Tennessee Limestone |
| | | | | 100 | 5 | 30 | 50 | Tennessee |

TABLE II-continued
EVALUATION OF ASPHALT EMULSION

| Emulsifier | Asphalt | % Dosage | pH Value | % Initial Coating | % Wash Off Coat After | | | Aggregate |
| --- | --- | --- | --- | --- | --- | --- | --- | --- |
| | | | | | 1 Min. | 30 Min. | 60 Min. | |
| J | Exxon 120–150 pen. | 1.0 | 2.5 | 100 | 2 | 70 | — | River Gravel Schloss |

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A cationic bituminous emulsion comprising from about 30% to about 80% by weight of bitumen, from about 0.1% to about 10% by weight of an emulsifier selected from the group consisting of reaction products of a polyamine reacted with a member of the group consisting of epoxidized unsaturated fatty acids of chain lengths between $C_8$ and $C_{22}$ and the esters thereof and adding water to make up 100% by weight, the emulsion having a pH in the range of from 2–7.

2. The cationic bituminous emulsion of claim 1 wherein the polyamines are selected from the group consisting of ethylene diamine, diethylene triamine, triethylene tetramine, tetraethylene pentamine, aminoethyl ethanolamine, aminoethyl piperazine, and hydroxyethyl piperazine.

3. The cationic bituminous emulsion of claim 1 including up to 90% of the total emulsifier formulation of one or more auxiliary emulsifiers selected from the group consisting of fatty amines, fatty propane diamines, fatty amidoamines, fatty imidazolines, amidoamines or imidazolines prepared from $C_{19}$-, $C_{21}$-dicarboxylic acids, $C_{22}$-tricarboxylic acids or sulfonated tall oil fatty acids, fatty monoquaternary ammonium salts, fatty diquaternary diammonium salts, and ethylene glycol polyethers of nonyl or dodecyl phenol.

4. The cationic bituminous emulsion of claim 1 including up to 90% of the total emulsifier formulation of one or more auxiliary emulsifiers selected from the group consisting of nitrogen derivatives of resin acids and nitrogen derivatives of kraft lignin.

5. The cationic bituminous emulsion of claim 1 wherein the emulsifier formulation is prepared by reacting a polyamine with a blend of sulfonated tall oil fatty acid, fatty mono-, di- or tricarboxylic acids and an epoxidized product of claim 1.

6. The cationic bituminous emulsion of claim 1 wherein the emulsifier formulation is prepared by co-reacting a polyamine with a blend of resin acids and one or more of the epoxidized compounds of claim 1.

7. The cationic bituminous emulsion of claim 1 wherein the emulsifier formulation is prepared by co-reacting a polyamine with a blend of kraft lignin and one or more of the epoxidized compounds of claim 1.

8. The cationic bituminous emulsion of claim 1 wherein the esters are selected from the group consisting of vegetable oils and animal fats.

9. The cationic bituminous emulsion of claims 1, 8, 2, 3, 4, 5, 6, or 7 comprising from about 60% to 70% bitumen by weight of the emulsion, from about 0.3% to 1.5% emulsifier by weight of the emulsion, and water to make up 100% by weight, the emulsion having a pH of about 3.

10. The cationic bituminous emulsion of claim 1 or 8 wherein the emulsion includes from 1% to 15% by volume of a hydrocarbon oil.

11. The cationic bituminous emulsion of claim 1 wherein a mixture of tall oil fatty acids is added to the bitumen prior to emulsification.

12. The cationic bituminous emulsion of claim 11 wherein the tall oil fatty acids mixture is tall oil pitch.

13. A paving slurry seal mixture of a cationic aqueous bituminous emulsion and mineral aggregate capable of being worked comprising: a densely graded mineral aggregate passing through No. 4 and at least 80% retained on 200 mesh screen; from about 8% to about 20% of an oil in water type emulsion, based on the weight of the mineral aggregate, wherein the emulsion is comprised of from about 55% to about 65% bitumen, based on the weight of the emulsion, from about 0.5% to about 2% of a cation-active emulsifier selected from the group consisting of reaction products of a polyamine reacted with a member of the group consisting of epoxidized unsaturated fatty acids of chain lengths between $C_8$ and $C_{22}$ and the esters thereof, based on the weight of the emulsion, and adding water to make up 100% by weight of the emulsion, the emulsion having a pH in the range of from 2–7; from about 4% to about 16% water, based on the weight of the mineral aggregate, added to form a slurry of the aggregate and the emulsion; and up to 3% of an inorganic or organic additive to reduce the setting time of the mixture.

14. The paving slurry seal mixture of claim 13 wherein the esters are selected from the group consisting of vegetable oils and animal fats.

15. The paving slurry seal mixture of claim 13 or 14 comprising from about 55% to 65% bitumen by weight of the emulsion, from about 0.5% to 2.0% emulsifier by weight of the emulsion, and water to make up 100% by weight, the emulsion having a pH of about 2.5.

16. The paving slurry seal mixture of claim 13 wherein a mixture of tall oil fatty acids is added to the bitumen prior to emulsification.

17. The paving slurry seal mixture of claim 16 wherein the tall oil fatty acids mixture is tall oil pitch.

18. The paving slurry seal mixture of claim 13 or 14 wherein the polyamines are selected from the group consisting of ethylene diamine, diethylene triamine, triethylene tetramine, tetraethylene pentamine, aminoethyl ethanolamine, aminoethyl piperazine, and hydroxyethyl piperazine.

19. The paving slurry seal mixture of claim 13 or 14 wherein the inorganic additive is selected from the group consisting of portland cement, hydrated lime, limestone dust, and fly ash, or salts and an ammonium sulfate, aluminum sulfate, ferric chloride, etc.

* * * * *